United States Patent
Kuroda (10) Patent No.: US 9,278,602 B2
(45) Date of Patent: Mar. 8, 2016

(54) STABILIZER LINK AND PRODUCTION METHOD FOR SAME

(75) Inventor: Shigeru Kuroda, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 294 days.

(21) Appl. No.: 13/818,010

(22) PCT Filed: Jul. 4, 2011

(86) PCT No.: PCT/JP2011/065297
§ 371 (c)(1),
(2), (4) Date: Feb. 20, 2013

(87) PCT Pub. No.: WO2012/026218
PCT Pub. Date: Mar. 1, 2012

(65) Prior Publication Data
US 2013/0147148 A1    Jun. 13, 2013

(30) Foreign Application Priority Data
Aug. 23, 2010 (JP) ................. 2010-186080

(51) Int. Cl.
*B23P 11/00* (2006.01)
*B60G 21/055* (2006.01)
(Continued)

(52) U.S. Cl.
CPC ............ *B60G 21/0551* (2013.01); *B23P 11/00* (2013.01); *B29C 45/14418* (2013.01); *B60G 21/055* (2013.01); *F16C 11/0642* (2013.01); *F16C 11/0671* (2013.01);
(Continued)

(58) Field of Classification Search
CPC ............... B60G 21/0551; B60G 2204/416; F16C 11/0685; F16C 11/069; B29C 45/14; B29C 45/1459; B29C 45/4819; B29C 39/10
USPC ............ 29/441.1, 527.1, 530; 264/271.1, 279
See application file for complete search history.

(56) References Cited

U.S. PATENT DOCUMENTS 5,427,467 A * 6/1995 Sugiura ................. 403/140
6,098,287 A * 8/2000 Takahashi et al. ....... 29/898.043
(Continued)

FOREIGN PATENT DOCUMENTS

| CA | 2289155 A1 * | 5/2000 | ........... B60G 21/055 |
| EP | 832769 A2 * | 4/1998 | ............... B60G 7/00 |

(Continued)

OTHER PUBLICATIONS

Aug. 30, 2011 International Search Report issued in International Application No. PCT/JP2011/065297 (with English Translation).

*Primary Examiner* — Essama Omgba
(74) *Attorney, Agent, or Firm* — Oliff PLC (57) ABSTRACT

The inner peripheral side radial direction surface of the fixing portion of the dust cover is abutted to the outer peripheral side radial direction surface of the flange portion of the ball seat, and the end portion of the fixing portion is abutted to the side surface of the outer peripheral side of the ball seat. The outer peripheral side radial direction surface of the fixing portion is pressed toward the flange portion by the radial direction surface pressing portion of the die member, and the fixing portion of the dust cover is held by the radial direction surface pressing portion of the die member and the flange portion. The pressing by the radial direction surface pressing portion is appropriately performed to withstand an injection molding pressure of the resin injection.

1 Claim, 7 Drawing Sheets (51) Int. Cl.
*F16C 11/06* (2006.01)
*B29C 45/14* (2006.01)
*B29L 31/22* (2006.01)

(52) U.S. Cl.
CPC ........ *F16C 11/0685* (2013.01); *B29L 2031/22* (2013.01); *B60G 2204/1224* (2013.01); *B60G 2204/416* (2013.01); *B60G 2204/42* (2013.01); *B60G 2204/4404* (2013.01); *B60G 2206/11* (2013.01); *B60G 2206/81012* (2013.01); *F16C 2220/04* (2013.01); *Y10T 29/4998* (2015.01); *Y10T 29/49853* (2015.01)

(56) References Cited

U.S. PATENT DOCUMENTS

| | | | | |
|---|---|---|---|---|
| 6,109,816 | A * | 8/2000 | Iwasaki | ............ 403/135 |
| 6,139,788 | A | 10/2000 | Dorr | |
| 6,254,114 | B1 * | 7/2001 | Pulling et al. | ........... 280/93.511 |
| 8,657,520 | B2 * | 2/2014 | Kuroda et al. | ............... 403/135 |
| 8,864,155 | B2 * | 10/2014 | Kuroda | ................. 280/124.107 |
| 9,056,538 | B2 * | 6/2015 | Kuroda | |
| 2006/0150416 | A1 | 7/2006 | Michioka et al. | |
| 2008/0193208 | A1 * | 8/2008 | Nordloh et al. | ............... 403/135 |
| 2011/0033226 | A1 | 2/2011 | Kuroda | |
| 2011/0150563 | A1 * | 6/2011 | Kuroda | ........................ 403/122 |
| 2013/0147748 | A1 * | 6/2013 | Westerinen et al. | .......... 345/173 |
| 2014/0131970 | A1 * | 5/2014 | Kuroda | ................. 280/124.107 |
| 2015/0001824 | A1 * | 1/2015 | Kuroda | ................. 280/124.106 |

FOREIGN PATENT DOCUMENTS

| | | | |
|---|---|---|---|
| JP | A-63-013912 | 1/1988 | |
| JP | A-06-117429 | 4/1994 | |
| JP | A-07-054835 | 2/1995 | |
| JP | A-08-284947 | 11/1996 | |
| JP | A-2004-316771 | 11/2004 | |
| JP | A-2005-265134 | 9/2005 | |
| JP | A-2006-322513 | 11/2006 | |
| JP | A-2008-164126 | 7/2008 | |
| JP | A-2009-257507 | 11/2009 | |
| WO | WO 2007009423 A1 * | 1/2007 | ............. B29C 45/14 |
| WO | WO 2011148792 A1 * | 12/2011 | ............. B60G 7/005 |
| WO | WO 2013012182 A1 * | 8/2013 | ........... B60G 21/055 |

* cited by examiner

Fig. 12B ial field

The present invention relates to a stabilizer equipped with a housing and a support bar. In particular, the present invention relates to an improvement in a production method for a housing and a support bar which are made of resin and integrally formed.

BACKGROUND ART

Figure 1:
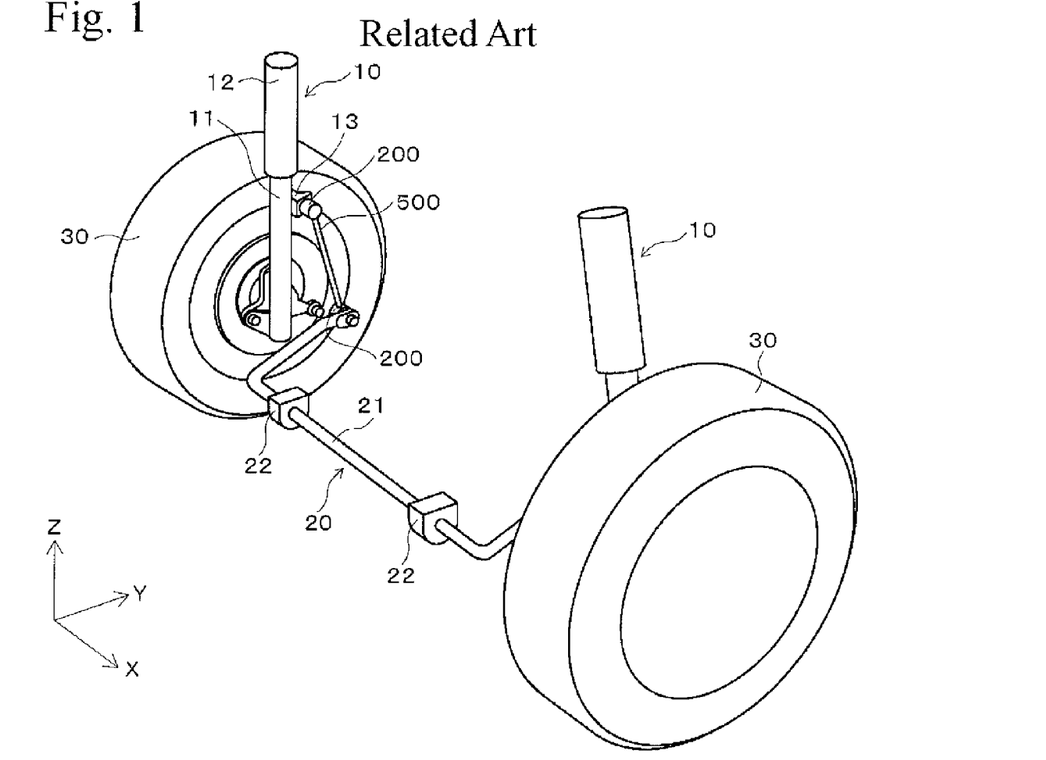
FIG. 1 is a perspective view showing a schematic structure of a front side wheel of vehicle.

A stabilizer is a ball joint part connecting a suspension apparatus and a stabilizer apparatus. FIG. 1 is a perspective view showing a schematic structure of front side wheel of vehicle. Each suspension apparatus 10 is provided at left and right tires 30 and has an arm 11 and a cylinder 12. A lower end portion of the arm 11 is fixed at a bearing supporting a shaft of the tire 30. The cylinder 12 is elastically movable relatively to the arm 11. A bracket 13, to which a stabilizer link 200 is mounted, is provided at the arm 11. The suspension apparatus 10 supports the weight of vehicle body that is applied to the tire 30. A stabilizer apparatus 20 is equipped with a bar 21 which is approximately U-shaped, and the stabilizer apparatus 20 is mounted to the vehicle body via bushes 22. The stabilizer apparatus 20 secures roll stiffness of vehicle.

The stabilizer links 200 are provided at the bracket 13 of the suspension apparatus 10 and at the end portion of the bar 21 of the stabilizer apparatus 20. The stabilizer links 200 are connected to each other by a support bar 500. The stabilizer link 200 transmits a load, which is generated when the suspension apparatus 10 receives an input from a road surface, to the stabilizer apparatus 20.

Figure 2:
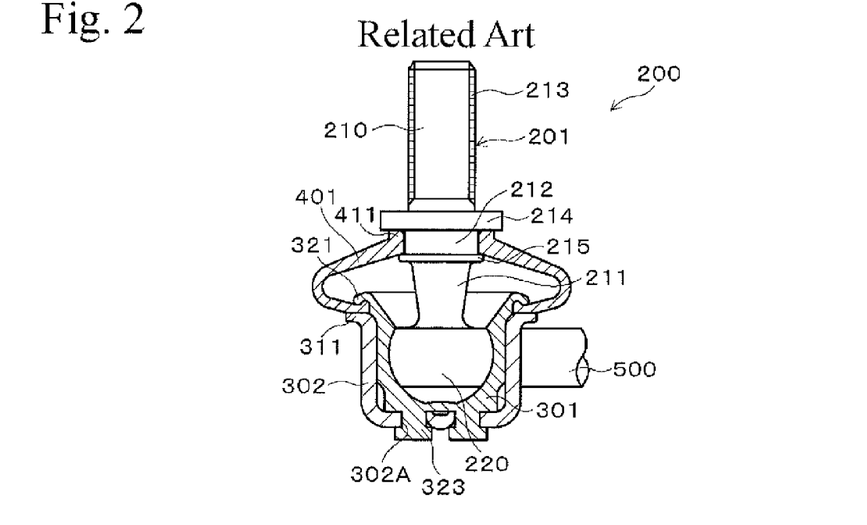
FIG. 2 is a side cross sectional diagram showing a conventional stabilizer link.

FIG. 2 is a side sectional diagram showing a portion of structure of specific example of the stabilizer link 200. The stabilizer link 200 is equipped with a stud ball 201, a ball seat 301, a housing 302, and a dust cover 401. The stud ball 201 has a stud portion 210 and a ball portion 220 which are integrally formed.

The stud portion 210 has a tapered portion 211, a straight portion 212, and a screw portion 213. The tapered portion 211 is formed at an upper end portion of the ball portion 220. A flange portion 214 and a projection portion 215 are formed at an upper end portion and a lower end portion of the straight portion 212. A lip portion 411 of upper end portion of the dust cover 401 abuts between the flange portion 214 and the projection portion 215 at the straight portion 212 so as to be fixed therebetween. The screw portion 213 of the stabilizer link 200 proximate to the suspension apparatus 10 is fixed at the bracket 13 of the arm 11 by screw fastening, and the screw portion 213 of the stabilizer link 200 proximate to the stabilizer apparatus 20 is fixed at the bar 21 by screw fastening.

The ball seat 301 and the housing 302 form a pivot support member which universally supports the stud ball 201. The ball portion 220 of the stud ball 201 is press-fitted into the ball seat 301. Thermal caulking portions 323 are formed at a bottom portion of the ball seat 301. The housing 302 holds the ball seat 301 therein. Each thermal caulking portion 323 projects through a hole 302A of bottom portion of the housing 302, and leading end portion of the thermal caulking portion 323 engages with a lower surface portion of the housing 302, so that the ball seat 301 is fixed at the housing 302. A fixing portion 412 of lower end portion of the dust cover 400 is held between flange portions 321 and 311 of the ball seat 301 and the housing 302 (for example, Patent Documents 1 and 2).

Figures 3A, 3B, 3C:
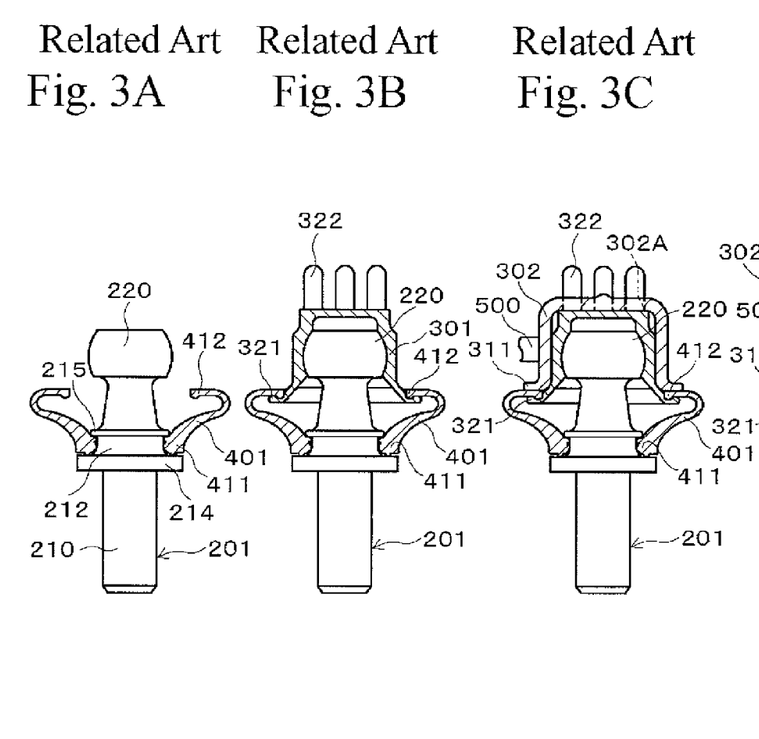
FIGS. 3A to 3E are side cross sectional diagrams of a portion of structure showing each process of a production method for conventional stabilizer links.

Production for stabilizer link 200 is performed by the processes shown in FIGS. 3A to 3E. FIGS. 3A to 3E are side cross sectional views of portions of structures showing each process of a production method for the stabilizer link 200. In FIGS. 3A to 3E, the screw portion 213 is not shown. First, as shown in FIG. 3A, the lip portion 411 of the dust cover 401 is inserted and held between the flange portion 214 and the projection portion 215 so as to closely contact the straight portion 212 of the stud ball 201. Next, as shown in FIG. 3B, the ball portion 220 of the stud ball 201 is pressed into the ball seat 301. In this case, the fixing portion 412 of the dust cover 401 is disposed at the outer peripheral surface side (upper surface side in FIG. 3) of the flange portion 321 of the ball seat 301. Reference numeral 322 is a pin portion formed at a surface (surface which is opposite to a surface into which the ball portion 220 is pressed) of the ball seat 301.

Figures 3D, 3E:
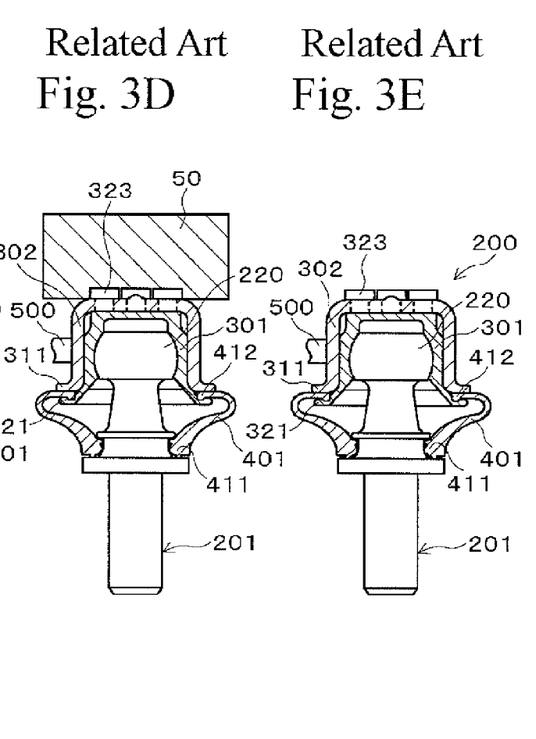

Next, as shown in FIG. 3C, the housing 302 and the support bar 500, which are integrally formed, is mounted to the ball seat 301. In this case, the fixing portion 412 of the dust cover 401 is held between the flange portions 321 and 311 of the ball seat 301 and the housing 302, and the pin portions 322 project from the holes 302A of the housing 302 to the outside. Next, as shown in FIG. 3D, the pin portions 322 of the ball seat 301 are deformed by heating using a thermal caulking machine 350, so that the thermal caulking portions 323 are formed. Thus, the ball seat 301 is fixed at the housing 302, so that the stabilizer link 200 is obtained as shown in FIG. 3E.

In stabilizer links, in the conventional techniques, iron was used as a material for the housing and support bar. In recent years, in order to reduce the weights of stabilizer links, for example, aluminum is used as a material of housing and support bar as proposed in, for example, Patent Documents 3 and 4, and resin is used as a material for the housing and support bar as proposed in, for example, Patent Document 5.

For example, in the techniques of Patent Documents 3 and 4, first, a ball seat made of resin is formed at a ball portion of a stud ball by injection molding. Thus, a subassembly having the ball portion and the ball seat is obtained. Next, the subassembly is inserted into a die as a core, melted aluminum alloy is injected into the die, and die casting is performed. A housing and a support bar, which are integrally formed, are obtained by this insert molding using the subassembly as a core. Next, after a stud portion is connected to the ball portion of the subassembly, a dust cover is mounted to the subassembly, so that a stabilizer link is obtained.

For example, in the technique of Patent Document 5, a housing and a support bar, which are made of resin, are integrally formed, and the housing and the support bar, which are integrally formed, are used for the production of the above stabilizer link 200. The housing and the support bar are used as the housing 302 and the support bar 500 which are integrally formed as shown in FIG. 3C, and the housing and the support bar are mounted to the ball seat 301. The process shown in FIG. 3D is performed, so that a stabilizer link is obtained.

Patent Document 1 is Japanese Unexamined Patent Application Publication No. Hei 6-117429, Patent Document 2 is Japanese Unexamined Patent Application Publication No. Hei 7-54835, Patent Document 3 is Japanese Unexamined Patent Application Publication No. 2004-316771, Patent Document 4 is Japanese Unexamined Patent Application Publication No. 2005-265134, and Patent Document 5 is Japanese Unexamined Patent Application Publication No. 2009-257507.

SUMMARY OF THE INVENTION

Problems Solved by the Invention

However, in the techniques of Patent Documents 3 and 4 using aluminum, the melting point of aluminum is about 660 degrees C. Due to this, when a subassembly has an outer peripheral portion formed by the ball seat in the insert molding, it is necessary that a heat-resistant material (PEEK (polyether ether ketone) or the like) be used as a material of ball seat. This material is expensive, and therefore production cost increases.

When the insert molding of Patent Documents 3 and 4 is used for the production for the stabilizer link 200 in which the fixing portion 412 of the dust cover 400 is held between flange portions 321 and 311, the dust cover 400 is made of resin (rubber or the like), so that heat deterioration may greatly occur. Due to this, mounting of the dust cover cannot be performed in the insert molding, it is necessary that mounting of the dust cover be performed in another process after the insert molding, and fixing of fixing portion of the dust cover by holding cannot be performed. Due to this, other parts (circlip or the like) are necessary, and production cost further increases.

In the technique of Patent Document 5 using resin, the above problems of the Patent Documents 3 and 4 using aluminum do not occur. However, the technique of Patent Document 5 can reduce the weight of a stabilizer link compared to the techniques of Patent Documents 3 and 4, but the technique of Patent Document 5 uses the same production method as that of the techniques of Patent Documents 1 and 2, so that the technique of Patent Document 5 cannot meet the need of production cost reduction in the field of stabilizer links in recent years.

The applicant has proposed a production method for stabilizer links in which insert molding, in which a resin is injected as a material for housing, is performed (see Japanese patent application 2010-12380, for example). Specifically, a subassembly having a stud ball, a ball seat, and a dust cover is inserted into a die as a core, and a cavity is formed. A resin is injected into the cavity, and injection molding is performed. In the production method using this injection molding, weight reduction of stabilizer link can be realized. In addition, thermal caulking process for fixing of a housing to a ball seat is not necessary, so that production cost reduction and the like can be realized.

In the inserting of the subassembly into the die, an end portion of the die is abutted on an outer peripheral portion of the fixing portion of the dust cover, the fixing portion of the dust cover is held by the end portion of the die and the outer peripheral portion side of the flange portion of the ball seat, and the cavity is formed by an inner surface of the die, an outer peripheral portion of the ball seat, and an outer peripheral portion side of the fixing portion of the dust cover. When the insert molding is performed in which a resin is injected into the cavity, in order to effectively prevent leakage of the resin to the outside, improvement in sealing characteristics between the dust cover and the die and between the dust cover and the ball seat is required, and a more desirable production method for stabilizer links is required.

Therefore, an object of the present invention is to provide a stabilizer link and a production method therefor which can effectively prevent leakage of a resin to the outside by improving in sealing characteristics between a dust cover and a die and between the dust cover and a ball seat.

According to one aspect of the present invention, a first production method for stabilizer links includes: a preparing step in which a stud ball, a ball seat, and a dust cover are prepared, the stud ball having a ball portion, the ball seat having a flange portion extending from a side surface of an outer peripheral side of the ball seat to a radial direction outside, the dust cover having a fixing portion; a subassembly forming step in which a subassembly having the stud ball, the ball seat, and the dust cover is formed; and an injection molding step in which the subassembly is inserted into a die as a core, a cavity is formed, and injection molding is performed by injecting a resin into the cavity, so that a housing and a support bar are integrally formed, the housing covering an outer peripheral portion of the ball seat, the support bar supporting the housing, wherein in the subassembly forming step, the ball portion of the stud ball is inserted into an opening portion of the ball seat, an inner peripheral side radial direction surface of the fixing portion of the dust cover is abutted to an outer peripheral side radial direction surface of the flange portion of the ball seat, and an end portion of the fixing portion is abutted to the side surface of the outer peripheral side of the ball seat, and in the inserting of the subassembly into the die, a die having a radial direction surface pressing portion extending toward a radial direction inside is used as the die, a predetermined gap is provided between an inner surface of the die and the outer peripheral portion of the ball seat, an outer peripheral side radial direction surface of the fixing portion of the dust cover is pressed toward the flange portion by the radial direction surface pressing portion of the die, and the fixing portion of the dust cover is held by the radial direction surface pressing portion of the die and the flange portion of the ball seat.

In the first production method for stabilizer links according to the aspect of the present invention, the subassembly having the stud ball, the ball seat, and the dust cover is formed, and the subassembly is inserted into the die as the core, the cavity is formed, and injection molding is performed by injecting the resin into the cavity. In the inserting of the subassembly into the die, the die having the radial direction surface pressing portion extending toward the radial direction inside is used as the die, and the outer peripheral side radial direction surface of the fixing portion of the dust cover is pressed toward the flange portion by the radial direction surface pressing portion of the die. In this case, the pressing by the radial direction surface pressing portion of the die is appropriately performed to withstand an injection molding pressure of the resin injection so that the fixing portion is not separated from the side surface of the outer peripheral side of the ball seat. Thus, sealing characteristics between the dust cover and the die member and between the dust cover and the ball seat can be improved. Thus, leakage of resin to the outside can be effectively prevented in insert injection.

The first production method for stabilizer links according to the aspect of the present invention can use various structures in order to improve various characteristics. For example, in order that the pressing by the radial direction surface pressing portion of the die be appropriately performed to withstand the injection molding pressure of the resin injection, according to one desirable embodiment, the radial direction surface pressing portion of the die may have a radial direction length, the outer peripheral side radial direction surface of the flange portion of the ball seat may have a facing portion which faces the radial direction surface pressing portion of the die, and the radial direction length of the radial direction surface pressing portion may be set to be equal to or longer than a length of the facing portion of the flange portion. According to another desirable embodiment, the fixing portion of the dust cover, which is pressed by the radial direction surface pressing portion of the die, may have a press margin set to be within a range of 5 to 30% of thickness of the fixing portion.

In order to obtain a predetermined load against stud removal in the stabilizer link, it may be desirable that the housing thickly cover the ball seat so as to extend to the neighborhood of the opening portion of the side surface of the ball seat. Specifically, according to another desirable embodiment, in the inserting of the subassembly into the die, an interval between an exposed portion of the outer peripheral side radial direction surface of the fixing portion of the dust cover and a center of the ball portion of the stud ball may be set to be ⅙ of a spherical diameter of the ball portion or more. According to another desirable embodiment, in the inserting of the subassembly into the die, the outer peripheral side radial direction surface of the fixing portion of the dust cover may have an exposed portion having a radial direction length of 1 mm or more.

In order to improve the sealing characteristics in the axial direction, according to another desirable embodiment, a side surface of the fixing portion of the dust cover may stand along an axial direction surface of the flange portion of the ball seat, and an interference of the side surface of the fixing portion with respect to the axial direction surface of the flange portion may be set to be 2.1 mm to 7.0 mm. According to another desirable embodiment, a side surface of the fixing portion of the dust cover may be pressed toward an axial direction surface of the flange portion of the ball seat by a side surface of the die which is proximate to the radial direction surface pressing portion, and the fixing portion of the dust cover, which is pressed by the side surface of the die, may have a press margin set to be within a range of 5 to 30% of thickness of the fixing portion. According to another desirable embodiment, an interference of the end portion of the fixing portion of the dust cover with respect to the side surface of the outer peripheral side of the ball seat may be set to be 2 mm to 5 mm.

According to another desirable embodiment, the flange portion of the ball seat may have a groove portion, and one projection portion may be formed at the end portion of the fixing portion of the dust cover so as to engage with the groove portion of the flange portion. In this case, in order to stabilize the attitude of the fixing portion sufficiently and secure the surrounding layout, the end portion of the fixing portion having the one projection portion formed thereat may have an axial direction length set to be two to four times as long as a radial direction length of the projection portion. According to another desirable embodiment, another projection portion may be formed at the end portion of the fixing portion of the dust cover so as to project in a direction opposite to a projection direction of the one projection portion. In this case, the end portion of the fixing portion having the projection portion and the another projection portion formed thereat may have an axial direction length set to be two to four times as long as a radial direction length of the projection portion.

According to another aspect of the present invention, a second production method for stabilizer links includes: a preparing step in which a stud ball, a ball seat, and a dust cover are prepared, the stud ball having a ball portion, the ball seat having a flange portion and a groove portion, the flange portion extending from a side surface of an outer peripheral side of the ball seat to a radial direction outside, the groove portion formed at a boundary portion between the flange portion and the side surface of the outer peripheral side of the ball seat, the dust cover having a fixing portion and a projection portion formed at an end portion of the fixing portion; a subassembly forming step in which a subassembly having the stud ball, the ball seat, and the dust cover is formed; and an injection molding step in which the subassembly is inserted into a die as a core, a cavity is formed, and injection molding is performed by injecting a resin into the cavity, so that a housing and a support bar are integrally formed, the housing covering an outer peripheral portion of the ball seat, the support bar supporting the housing, wherein in the subassembly forming step, the ball portion of the stud ball is inserted into an opening portion of the ball seat, an inner peripheral side radial direction surface of the fixing portion of the dust cover is abutted to an outer peripheral side radial direction surface of the flange portion of the ball seat, and a portion of the projection portion of the fixing portion is engaged with the groove portion, in the inserting of the subassembly into the die, a die having a radial direction surface pressing portion extending toward a radial direction inside is used as the die, a predetermined gap is provided between an inner surface of the die and the outer peripheral portion of the ball seat, an outer peripheral side radial direction surface of the fixing portion of the dust cover is pressed toward the flange portion by the radial direction surface pressing portion of the die, and the fixing portion of the dust cover is held by the radial direction surface pressing portion of the die and the flange portion of the ball seat, and in the holding of the fixing portion, the projection portion of the fixing portion is compressed by the radial direction surface pressing portion of the die and the groove portion of the ball seat, and internal pressure is thereby generated in the projection portion.

In the second production method for stabilizer links according to the aspect of the present invention, the dust cover having the fixing portion and the projection portion formed at the end portion of the fixing portion is used, and in the holding of the fixing portion in the inserting of the subassembly into the die, the projection portion of the fixing portion is compressed by the radial direction surface pressing portion of the die and the groove portion of the ball seat, and the internal pressure is thereby generated in the projection portion. In this case, the projection portion can be compressed by the side surface of the outer peripheral side of the ball seat, the groove portion of the flange portion, and the radial direction surface pressing portion of the die member, so that the internal pressure in the projection portion can be higher. The shapes of the respective portions are appropriately designed such that the internal pressure generated in the projection portion is larger than the injection molding pressure, so that the sealing characteristics between the dust cover and the die and between the dust cover and the ball seat can be improved. Thus, leakage of the resin to the outside can be effectively prevented in the insert injection.

The second production method for stabilizer links according to the aspect of the present invention can use various structures in order to prevent leakage of the resin to the outside effectively. For example, according to one desirable embodiment, a radial direction surface pressing portion side tapered surface may be formed at an end portion of the radial direction surface pressing portion of the die, a flange portion side tapered surface may be formed at the groove portion of the flange portion of the ball seat and faces the radial direction surface pressing portion side tapered surface, and the projection portion may be pressed by the radial direction surface pressing portion side tapered surface and the flange portion side tapered surface, thereby being compressed toward the radial direction inside.

According to another aspect of the present invention, a stabilizer link is produced by the production method for stabilizer links according to the aspect of the present invention, and can obtain the same effect as those of the production method for stabilizer links according to the aspect of the present invention.

According to the stabilizer link or the production method therefor, leakage of the resin to the outside can be effectively prevented in the insert injection, and another effect can be obtained.

BRIEF DESCRIPTION OF DRAWINGS

FIGS. 12A and 12B are diagrams showing a structure of a specific example of a housing and a support bar, which are obtained by insert molding, of a stabilizer link according to embodiments of the present invention.

EXPLANATION OF REFERENCE NUMERALS

Reference numeral 60 denotes a die, 61 denotes a die body, 62 denotes a die member, 62A denotes a radial direction surface pressing portion, 62B denotes a side surface, 62C denotes a tapered surface, 100 denotes a stabilizer link, 101 denotes a stud ball, 110 denotes a ball portion, 120 denotes a ball seat, 121 denotes a flange portion, 121A denotes a groove portion, 121B denotes an outer peripheral side radial direction surface, 121C denotes an axial direction surface, 121D denotes a tapered surface, 122 denotes a side surface of an outer peripheral side, 130 denotes a housing, 131 denotes an end portion, 401 denotes a dust cover 401 denotes a fixing portion, 412B denotes an outer peripheral side radial direction surface, 412C denotes an inner peripheral side axial direction surface, 412D denotes an outer peripheral side axial direction surface, 413 denotes an end portion, 413A, 413B, and 414 denote a projection portion, and 500 denotes a support bar.

DESCRIPTION OF THE PREFERRED EMBODIMENTS

Figure 5:
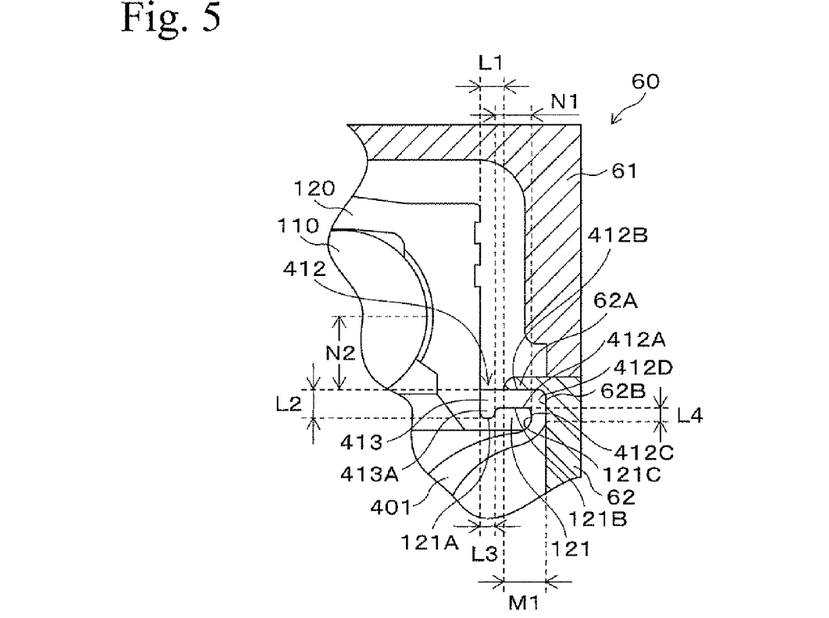
FIG. 5 is an enlarged side cross sectional diagram showing an insert molding condition of a production method for stabilizer links according to a first embodiment of the present invention and showing a portion including a fixing portion of a dust cover.
Figure 6:
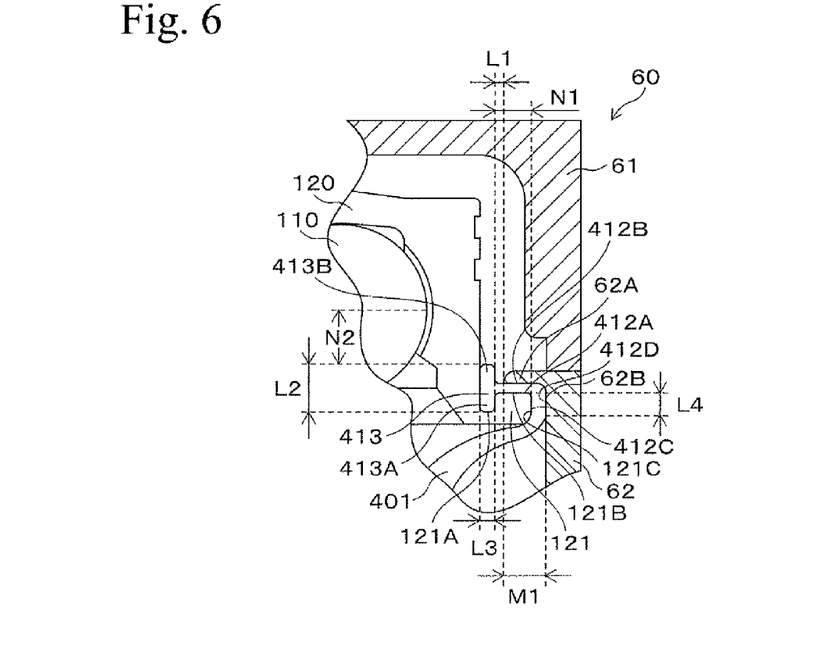
FIG. 6 is an enlarged side cross sectional diagram showing an insert molding condition of a modification example of a production method for stabilizer links according to a first embodiment of the present invention and showing a portion including a fixing portion of a dust cover.
Figure 10:
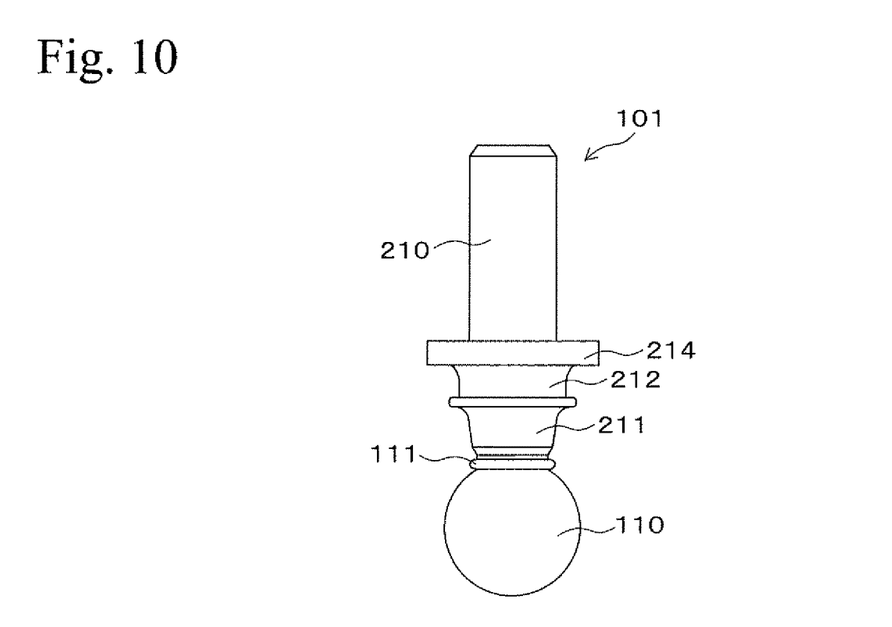
FIG. 10 is a schematic side view showing a structure of a stud ball of a stabilizer link of embodiments according to the present invention.
Figure 11:
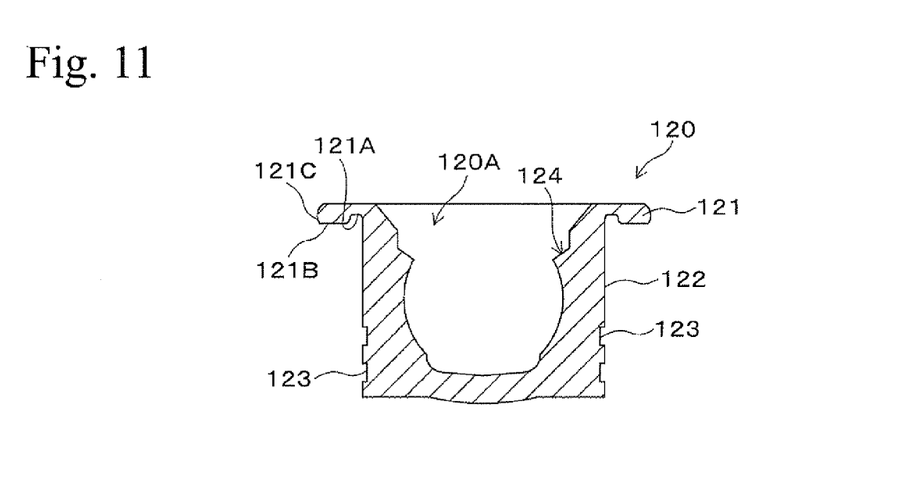
FIG. 11 is a schematic side cross sectional view showing a structure of a ball seat of a stabilizer link according to embodiments of the present invention.

1. First Embodiment
1.1 Production Method of First Embodiment
A. Respective Production Processes A first embodiment of the present invention will be explained hereinafter with reference to Figures. FIGS. 4A to 4D are side cross sectional diagrams of a portion of structure showing each process of production method for stabilizer link 100 according to embodiments of the present invention. FIG. 5 is an enlarged side cross sectional diagram showing an insert molding condition of production method for stabilizer link 100 according to a first embodiment of the present invention and showing a portion including a fixing portion 412 of a dust cover 401. FIG. 6 is an enlarged side cross sectional diagram showing an insert molding condition of a modification example of a production method for stabilizer link 100 according to a first embodiment of the present invention and showing a portion including a fixing portion 412 of a dust cover 401. FIG. 10 is a schematic side view showing a structure of a stud ball 101. FIG. 11 is a schematic side cross sectional view showing a structure of a ball seat 120. In FIGS. 4A to 4D and 10, a screw portion of the stud ball 101 is not shown.

A production method for stabilizer link 100 of the first embodiment is greatly different from the production method for stabilizer link 200 shown in FIGS. 3A to 3E in that a housing and a support bar are obtained by injection molding performed by insert molding using a resin. Thus, in the production method for stabilizer link of the first embodiment, a shape of ball portion of stud ball, a structure of ball seat, a shape of dust cover, and the like are modified. Thus, in the first embodiment, the same reference numerals in FIGS. 1 and 2 are used for the same components in FIGS. 1 and 2, and explanations thereof will be omitted.

First, a stud ball 101, a ball seat 120, and a dust cover 401 are prepared.

In the stud ball 101, as shown in FIG. 10, for example, a steel ball which is approximately spherical is desirably used as the ball portion 110, and the ball portion 110 is desirably welded to a stud portion 210. In this feature, even when shrinkage deformation of the ball seat 120 occurs in the injection molding of housing 130, the action inhibition of the ball portion 110 can be prevented.

As shown in FIG. 11, the ball seat 120 has an opening portion 120A at one surface thereof. A flange portion 121, which extends from a side surface 122 of an outer peripheral side of the ball seat 120 in a radial direction outside, is formed at the side surface 122. A groove portion 121A engaging with a projection portion 413A of a fixing portion 412 of the dust cover 401 is desirably formed at a boundary portion between the flange portion 121 and the side surface 122 of the outer peripheral side at the flange portion 121. Reference numeral 121B denotes an outer peripheral side radial direction surface (upper surface of the flange portion 121 in FIGS. 5 and 6) of the flange portion 121 to which an inner peripheral side radial direction surface 412A of the fixing portion 412 of the dust cover 401 abuts. Reference numeral 121C denotes an axial direction surface (side surface of outer peripheral side of the flange portion 121 in FIGS. 5 and 6) of the flange portion 121 to which an inner peripheral side axial direction surface 412C of the fixing portion 412 of the dust cover 401 abuts.

A groove portion 123 having a recessed shape is desirably formed along a circumferential direction at the side surface 122 of the outer peripheral side. In this case, in the stabilizer link 100, a projection portion 133 corresponding to the shape of the groove portion 123 of the ball seat 120 can be formed at an inner peripheral portion of housing 130, and the portions 123 and 133 can be fitted into each other. Therefore, sufficient strength against stud removal can be secured in the same manner as in the conventional thermal caulking portions. The groove portion 123 may be formed so as to have a shape divided in the circumferential direction of the side surface 122 of the outer peripheral side of the ball seat 120, so that rotational action of the ball seat 120 relative to the housing 130 can be prevented. Instead of the groove portion 123, a projection portion or a tapered portion may be formed at the side surface of the outer peripheral portion of the ball seat 120. The projection portion may have a projection shape and may be formed along the circumferential direction. For example, the tapered portion may have an inclined shape of which diameter is larger from the upper portion side to the bottom portion of the outer peripheral portion. An undercut portion having a recessed shape may be formed at the outer peripheral portion of the ball seat 120.

As shown in FIG. 10, a burr 111 may be formed at a weld portion of the stud ball 110. In this case, a pocket portion 124 having a recessed shape, in which the burr 111 of the weld portion can be provided, is desirably formed at an inner peripheral portion of the ball seat 120 along the circumferential direction. In this feature, the inhibition of swing action of the stud ball 101, which may be caused by the burr 111 of the weld portion of the stud ball 101, can be prevented, so that the swing angle of the stud ball 101 can be sufficiently secured.

In the dust cover 401, a lip portion 411 is formed at one end portion, and the fixing portion 412 is formed at another end portion. A projection portion 413A is desirably formed at an inner peripheral surface of the end portion 413 of the fixing portion 412. As shown in FIG. 6, a projection portion 413B (another projection portion) projecting in a direction opposite to a projection direction of the projection portion 413A may be formed at an outer peripheral surface of the end portion 413 of the fixing portion 412. The side surface of the fixing portion 412 desirably stands along the axial direction in formation of the dust cover 401. In this case, a side surface of an inner peripheral side of the fixing portion 412 is an inner peripheral side axial direction surface 412C, and a side surface of an outer peripheral side of the fixing portion 412 is an outer peripheral side axial direction surface 412D. Reference numeral 412A denotes an inner peripheral side radial direction surface (lower surface of the fixing portion 412 in FIGS. 5 and 6) of the fixing portion 412 of the dust cover 401, and reference numeral 412B denotes an outer peripheral side radial direction surface (upper surface of the fixing portion 412 in FIGS. 5 and 6) of the fixing portion 412 of the dust cover 401.

Figures 4A, 4B:
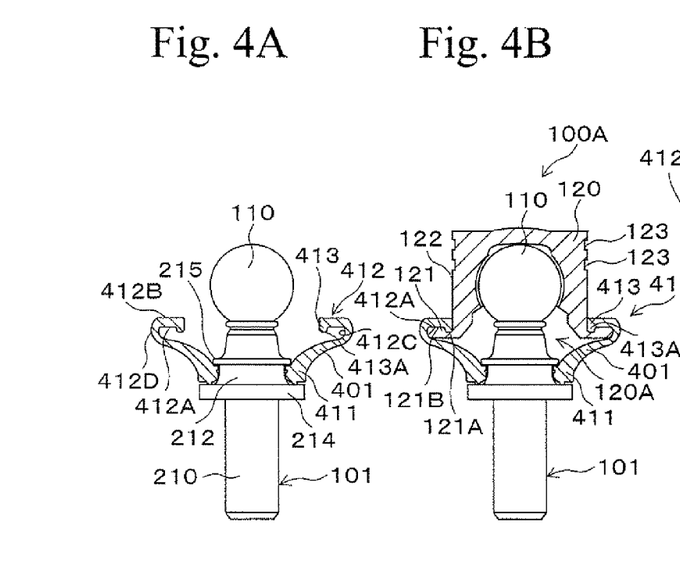
FIGS. 4A to 4D are side cross sectional diagrams of a portion of structure showing each process of a production method for stabilizer links according to embodiments of the present invention.

Next, as shown in FIG. 4A, the lip portion 411 of the one end portion of the dust cover 401 is inserted and held between the flange portion 214 and the projection portion 215 so as to contact the straight portion 212 of the stud ball 101.

Next, as shown in FIG. 4B, the ball portion 110 of the stud ball 101 is press-fitted into the ball seat 120, and the inner peripheral side radial direction surface 412A of the fixing portion 412 of the another end portion of the dust cover 401 is abutted to the outer peripheral side radial direction surface (upper surface side in FIG. 4) of the flange portion 121 of the ball seat 120. The end portion 413 of the fixing portion 412 is abutted to the side surface 122 of the outer peripheral side of the ball seat 120. In this case, the projection portion 413A of the fixing portion 412 is projected toward the groove portion 121A of the flange portion 121 so as to engage therewith. Thus, a subassembly 100A having the stud ball 101, the ball seat 120, and the dust cover 401 is obtained.

Figure 4C:
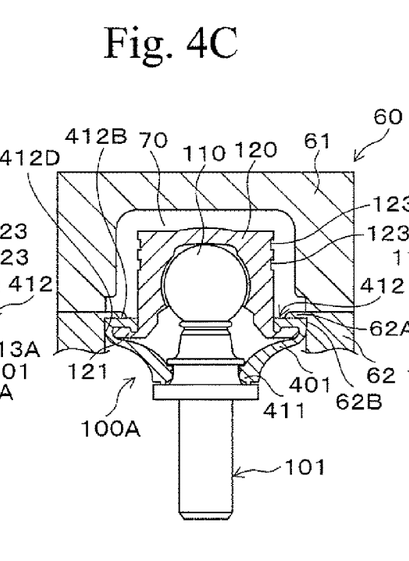

Next, as shown in FIG. 4C, the subassembly 100A is inserted as a core into a die body 61 of a die 60, a cavity 70 is formed, and a resin is injected in the cavity 70, and injection molding is thereby performed. In this insert molding, a housing and a support bar are integrally formed. FIG. 4C is a cross sectional diagram showing a cross sectional structure perpendicular to an axial direction of support bar 140 and showing a structure including a housing forming die section. The die 60 has a configuration extending in a direction perpendicular to the plane of the sheet of FIG. 4C.

In the insert molding of the first embodiment, a die having a die member 62 is used as the die 60. For example, the die member 62 has a radial direction surface pressing portion 62A having a straight shape extending in a radial direction inside. In the inserting of the subassembly 100A into the die body 61, as shown in FIG. 5, a predetermined gap is provided between an inner surface of the die body 61 and the outer peripheral portion of the ball seat 120, the outer peripheral side radial direction surface 412B of the fixing portion 412 of the dust cover 401 is pressed toward the flange portion 121 by the radial direction surface pressing portion 62A of the die member 62, and the fixing portion 412 is held by the radial direction surface pressing portion 62A and the flange portion 121.

Thus, the cavity 70 is formed by the inner surface of the die 60, the outer peripheral portion of the ball seat 120, and the fixing portion 412 of the dust cover 401. In this case, the cavity surface of the die 61 has a shape corresponding to outer peripheral shapes of housing and support bar.

Figure 12A:
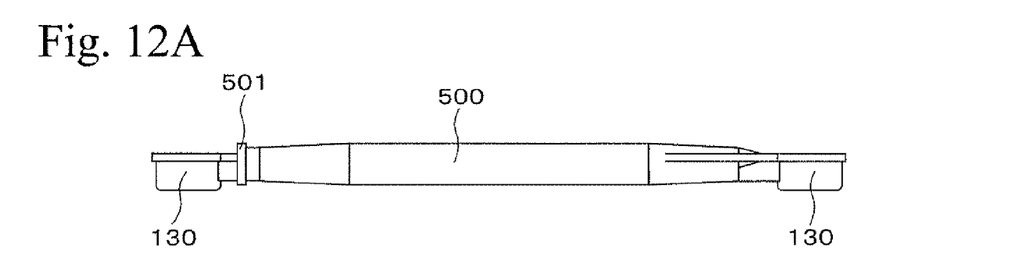
FIG. 12A shows a specific example in which a phase angle between housings is 0 degree.
Figure 12B:
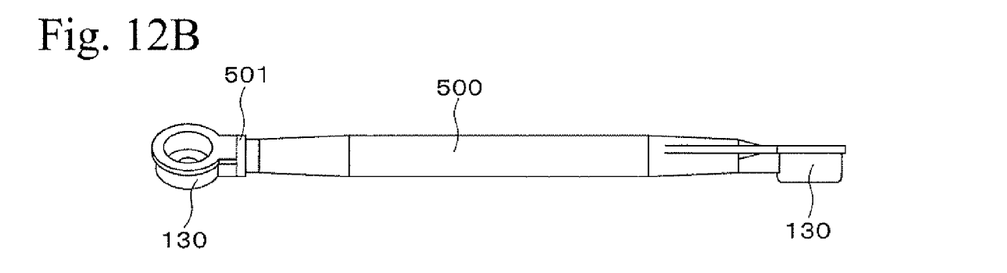
FIG. 12B shows a specific example in which a phase angle between housings is more than 0 degree and less than 180 degrees.

FIGS. 12A and 12B are diagrams showing a structure of a specific example of a housing and a support bar, which are obtained by insert molding, of a stabilizer link according to embodiment of the present invention. FIG. 12A shows a specific example in which a phase angle between housings is 0 degree, and FIG. 12B shows a specific example in which a phase angle between housings is more than 0 degree and less than 180 degrees. For example, as shown in FIGS. 12A and 12B, when housings 130 are formed at both end portions of the support bar 500, a flange portion 501 for a divided die is desirably provided at a boundary portion between the housing 130, which is proximate to one end portion of the support bar 500, and the support bar 500. For example, the flange portion 501 for a divided die has a cross sectional shape which is an approximately true circle shape.

When the housing 130 and the support bar 500 shown in FIG. 12B are formed, the die 60 has a support bar forming die section and housing forming die sections which are provided at both end portions of the support bar forming die section. In this case, it is desirable that the die 60 have a first divided die and a second divided die. The first divided die is used for forming the housing 130 proximate to one end portion of the support bar 500 (that is, the housing 130 having the flange portion 501 for divided die), and the second divided die is used for forming the support bar 500 and the housing 130 proximate to another end portion of the support bar 500. In this case, the die 60 may be a divided die structured such that a rotational angle of the first divided die relative to the second divided die can be adjusted at a predetermined angle. The rotational angle is set at a portion of the die 60 which corresponds to the flange portion 501 for divided die. A typical cam member or the like can be used as a driving device for moving an upper die relatively to a lower die of the divided die having the first divided die and the second divided die.

In the above manner, since the die 60 is a divided die structured such that the rotational angle of the first divided die relative to the second divided die, which is set at the portion of the die 60 corresponding to the flange portion 501 for the divided die, can be adjusted, the phase angle between housings 130 can be set freely from 0 degree to 180 degrees.

The resin used in the injection molding is a resin which is a material for the housing and the support bar. In a case in which a predetermined strength of the housing and the support bar is secured, for example, Nylon 66 including 30 wt % of fiberglass, Nylon 46 including 30 wt % of fiberglass, or PPS (polyphenylene sulfide) including 30 wt % of fiberglass is desirably used as the material. In this case, the included amount of the fiberglass can be appropriately adjusted depending on required characteristics of the housing and the support bar.

Figure 4D:
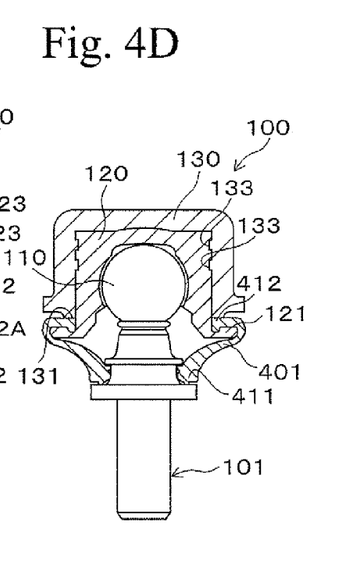

The resin is filled in the cavity 70 by this insert molding, so that as shown in FIG. 4D, the housing 130 and the support bar 500 are integrally formed, so that a stabilizer link 100 is obtained. The housing 130 covers an outer peripheral portion of the ball seat 120, and the support bar 500 supports the housing 130.

(B) Advantages of Insert Molding of Resin

In the stabilizer link, in general, specified values of swinging torque, rotational torque, and elastic lift are set, and in general, these specified values are often required to be set at lower values. The torque and the elastic lift are opposite to each other, and these specified values depend on interference of housing and ball seat or interference of ball seat or stud ball. Therefore, in order to meet required characteristics of a vehicle, it is important that the interference be set at optimum value based on input load and durability requirements.

In contrast, in the first embodiment, when a melting point of the resin which is the material of the ball seat 120 is lower than those of the housing 130 and the support bar 500, in the injection molding by the insert molding, shrinkage deformation of the ball seat 120 may occur by heat and pressure. In this case, relationships between conditions of injection molding (temperature and pressure of resin injected in the injection molding, injection time period, and the like) and shrinkage deformation amount of the ball seat 120 are obtained in advance. In inserting of the ball portion 110 of the stud ball 101 into the ball seat 120, for example, at least one of the ball seat 120, which has an inner diameter set at a predetermined value, and the ball portion 110, which has an outer diameter set at a predetermined value, is used, so that clearance between the ball portion 110 and the ball seat 120 can be set at a predetermined value. The injection conditions of the insert molding are appropriately controlled, and the injection molding is performed, so that interference of the ball seat 120 can be set at an optimum value after the injection molding.

The resin injected in the injection molding by the insert molding has a melting point lower than that of aluminum, and the temperature of injection molding can be set to be equal to or lower than 300 degrees C. Thus, heat deterioration of the ball seat 120 can be prevented by appropriately setting the molding time period. Therefore, in this case, polyacetal, which is inexpensive, can be used as the material of the ball seat 120 in a manner different from the case of using aluminum as the injection molding material. In a case in which the dust cover 401 made of rubber is mounted and the subassembly 100A is used as a core in forming of the subassembly 100A, the injection molding temperature can be set to be lower as described above, and in a manner different from the case of using aluminum as the injection molding material, heat deterioration of the dust cover 401 can be prevented even when the resin directly contacts the dust cover 401 made of rubber.

As described above, the subassembly 100A having the stud ball 101 and the ball seat 120 is inserted as a core into the die 60, the cavity 70 is formed, and the insert molding in which the resin is injected in the cavity 70 is performed. Thus, the conventional process (shown in FIG. 3D), in which the ball seat 120 is subjected to thermal caulking, is unnecessary. In this manner, the number of production processes can be reduced, so that production cost can be reduced.

The interference of the ball seat 120 can be set at optimum value after the injection molding by the insert molding. As a result, swinging torque, rotational torque, and elastic lift, which are specified values of a stabilizer link, can be set at desired values, and characteristics required by vehicle can be satisfied. The structure, in which the fixing portion 412 of the dust cover 401 is held by the end portion 131 of the housing 130 and the flange portion 121 of the ball seat 120, can be used, so that another process, in which the dust cover 401 is separately provided after the insert molding, is unnecessary, and other parts (circlip or the like), which was used in the conventional method using aluminum, is unnecessary. As a result, the production cost can be further reduced.

Since the insert molding using the subassembly 100A as a core is performed, the resin is filled in the cavity 70, and the housing 130 made of resin tightly adheres to the outer peripheral portion of the ball seat 120 and the fixing portion 412 of the dust cover 401. Thus, the interference of the housing 130 relative to the ball seat 120 can be set at a desired value, so that torque characteristics and elastic lift can be at desired values. Therefore, there is no influence by evenness of size of a counter member, so that dimensional control is unnecessary.

1.2 Sealing Characteristics of Each Portion in Insert Molding

In the above insert molding, as shown in FIG. 5, at the portion between the dust cover 401 and the ball seat 120, the inner peripheral side radial direction surface 412A (lower surface in FIGS. 5 and 6) of the fixing portion 412 of the dust cover 401 is abutted to the outer peripheral side radial direction surface 121B (upper surface in FIGS. 5 and 6) of the flange portion 121 of the ball seat 120, and the end portion 413 of the fixing portion 412 is abutted to the side surface 122 of the outer peripheral side of the ball seat 120. In this case, the projection portion 413A of the end portion 413 is projected toward the groove portion 121A of the flange portion 121 so as to engage therewith. Thus, sealing can be performed between the dust cover 401 and the ball seat 120.

In the portion between the dust cover 401 and the die member 62, the outer peripheral side radial direction surface 412B of the fixing portion 412 of the dust cover 401 is pressed toward the flange portion 121 by the radial direction surface pressing portion 62A of the die member 62, and the fixing portion 412 of the dust cover 401 is held by the radial direction surface pressing portion 62A of the die member 62 and the flange portion 121. Thus, sealing can be performed between the dust cover 401 and the die member 62.

In this case, in sealing between the outer peripheral side radial direction surface 412B of the fixing portion 412 and the radial direction surface pressing portion 62A of the die member 62, the outer peripheral side radial direction surface 412B of the fixing portion 412 of the dust cover 401 is pressed toward the flange portion 121 by the radial direction surface pressing portion 62A, and it is necessary that this pressing be performed to withstand an injection molding pressure of the resin injection. However, when the pressing by the radial direction surface pressing portion 62A is excessively performed, the end portion 413 of the fixing portion 412 may be separated from the side surface 122 of the outer peripheral side of the ball seat 120 at the portion indicated by reference symbol P in FIG. 7. Due to this, the resin may flow therefrom to the portion between the dust cover 401 and the ball seat 120.

Figure 7:
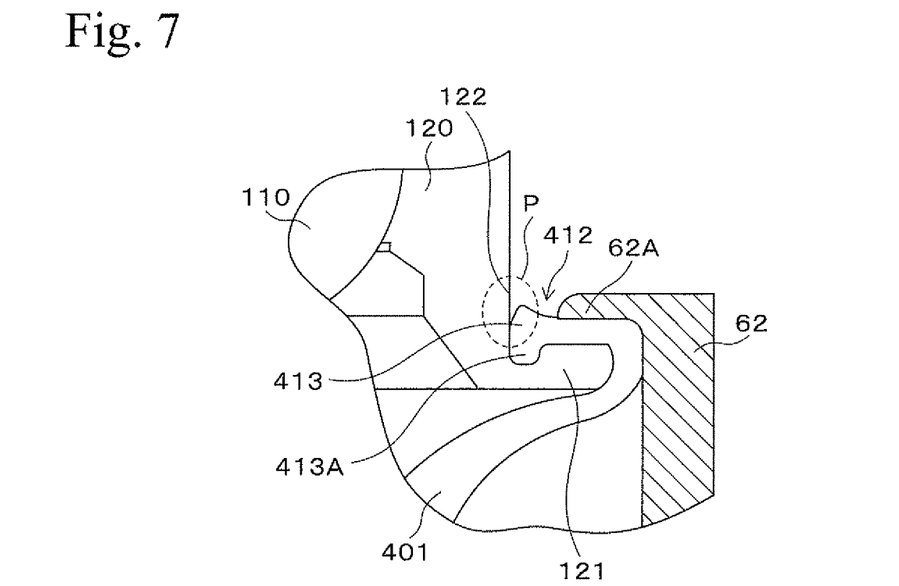
FIG. 7 is an enlarged side cross sectional diagram showing problems of an insert molding of a production method for stabilizer links and showing a portion including a fixing portion of a dust cover.

Therefore, the pressing by the radial direction surface pressing portion 62A is appropriately performed to withstand an injection molding pressure of the resin injection, so that sealing characteristics between the dust cover 401 and the ball seat 120 can be improved. In this case, the inner peripheral side radial direction surface 412A of the fixing portion 412 of the dust cover 401 is pressed to the outer peripheral side radial direction surface 121B of the flange portion 121 of the ball seat 120, so that sealing characteristics between the dust cover 401 and the ball seat 120 can be more improved.

As described above, in the first embodiment, the pressing by the radial direction surface pressing portion 62A of the die member 62 is appropriately performed to withstand an injection molding pressure of the resin injection, so that sealing between the dust cover 401 and the die member 62 and sealing between the dust cover 401 and the ball seat 120 can be reliably improved. Thus, leakage of resin to the outside can be effectively prevented in insert injection.

In particular, in the first embodiment, when the following conditions are satisfied, various characteristics can be improved (In particular, sealing between the dust cover 401 and the die member 62 and sealing between the dust cover 401 and the ball seat 120 can be more improved). This will be explained by mainly referring to FIGS. 5 and 6.

Regarding the radial direction, in order that the pressing by the radial direction surface pressing portion 62A be appropriately performed to withstand an injection molding pressure of the resin injection, the radial direction length M1 of the radial direction surface pressing portion 62A of the die member 62 (that is, the projection length of the die member 62 which extends from the side surface 62B to the radial direction inside) is desirably set to be equal to or longer than the length N1 of the facing portion of the flange portion 121 of the ball seat 120 which faces the radial direction surface pressing portion 62A. In pressing the fixing portion 412 by the radial direction surface pressing portion 62A of the die member 62, the press margin of the fixing portion 412 is desirably set to be within a range of 5 to 30% of the thickness of the fixing portion 412. In this case, the press margin is a ratio of thickness of a portion of the outer peripheral side radial direction surface 412B (upper surface of the fixing portion 412 in FIGS. 5 and 6) of the fixing portion 412 which is squashed by the pressing by the radial direction surface pressing portion 62A (that is, the ratio is (thickness of the squashed portion of the outer peripheral side radial direction surface 412B of the fixing portion 412)/(thickness of the outer peripheral side radial direction surface 412B of the fixing portion 412 which is in free condition.)).

In this manner, although the sealing is desirably performed between the outer peripheral side radial direction surface 412B of the fixing portion 412 of the dust cover 401 and the radial direction surface pressing portion 62A of the die member 62, in the stabilizer link 100, it is necessary that the dust cover 401 be held by the flange portion 121 of the ball seat 120 and the end portion 131 of the housing 130. In order to obtain a predetermined load against stud removal, it is desirable that the housing 130 thickly covers the ball seat 120 so as to extend to the neighborhood of the opening portion 120A of the side surface 122 of the outer peripheral side of the ball seat 120. Specifically, in the axial direction, the interval N2 between the exposed portion of the outer peripheral side radial direction surface 412B of the fixing portion 412 of the dust cover 401 and the center of the ball portion 110 of the stud ball 101 is desirably set to be 1/6 of the spherical diameter of the ball portion 110 or more. For example, the ball portion 110 is a ball portion of ϕ16, the interval N2 is desirably set to be 2.7 mm or more. In the radial direction, the radial direction length L1 of the exposed portion of the outer peripheral side radial direction surface 412B of the fixing portion 412 is desirably set to be 1 mm or more.

In order to improve the sealing characteristics in the axial direction, in formation of the dust cover 401, the side surface of the fixing portion 412 is desirably formed as the inner peripheral side axial direction surface 412C so as to have a shape corresponding to that of the axial direction surface 121C (side surface of outer peripheral side in FIGS. 5 and 6) of the flange portion 121 of the ball seat 120. In this case, the inner peripheral side axial direction surface 412C of the fixing portion 412 stands along the axial direction surface 121C of the flange portion 121 of the ball seat 120.

The inner peripheral side axial direction surface 412C of the fixing portion 412 desirably has an interference of about 2.1 mm to 7.0 mm relative to the axial direction surface 121C of the flange portion 121. In this case, the interference is difference between the outer diameter of the axial direction surface 121C of the flange portion 121 and the inner diameter of the inner peripheral side axial direction surface 412C of the fixing portion 412 which is in a free condition. The end portion 413 of the fixing portion 412 of the dust cover 401 desirably has an interference of about 2 mm to 5 mm relative to the side surface 122 of the outer peripheral side of the ball seat 120. In this case, the interference is difference between the outer diameter of the side surface 122 of the outer peripheral side of the ball seat 120 and the inner diameter of the axial direction surface of the end portion 413 of the fixing portion 412 which is in a free condition.

The outer peripheral side axial direction surface 412D of the fixing portion 412 is desirably pressed by the side surface 62B of the die member 62. In this case, the pressed length in the axial direction is desirably equal to or longer than the length L4. The length L4 is an axial direction length of a cross sectional approximately-straight portion of the axial direction surface 121C of the flange portion 121, and extends to the outer peripheral side radial direction surface 121B. The press margin of the fixing portion 412 which is pressed by the side surface 62B of the die 62 is desirably set within a range of 5 to 30% of thickness of the fixing portion 412. In this case, the press margin is a ratio of thickness of a portion of the outer peripheral side axial direction surface 412D of the fixing portion 412 which is squashed by the pressing by the side surface 62B (that is, the ratio is (thickness of the squashed portion of the outer peripheral side axial direction surface 412D of the fixing portion 412)/(thickness of the outer peripheral side axial direction surface 412D of the fixing portion 412 which is in free condition.)).

In the die member 62, the outer peripheral side axial direction surface 412D of the fixing portion 412 is pressed toward the flange portion 121 by the side surface 62B proximate to the radial direction surface pressing portion 62A, so that the inner peripheral side axial direction surface 412C of the fixing portion 412 can be reliably pressed toward the flange portion 121. Thus, the sealing characteristics between the side surface 62B of the die member 62 and the outer peripheral side axial direction surface 412D of the fixing portion 412 can be improved, and the sealing characteristics between the axial direction surface 121C of the flange portion 121 and the inner peripheral side axial direction surface 412C of the fixing portion 412 can be more improved. Thus, the sealing characteristics in the axial direction can be more improved.

In order to stabilize the attitude of the fixing portion 412 and secure the surrounding layout, the axial direction length L2 of the end portion 413 of the fixing portion 412 having the projection portion 413A formed thereat is desirably set to be two to four times as long as the radial direction length L3 of the projection portion 413A.

When the axial direction length L2 is set to be less than two times as long as the radial direction length L3, in the pressing by the radial direction surface pressing portion 62A of the die member 62, the end portion 413 of the fixing portion 412 of the dust cover 401 may be easily separated from the side surface 122 of the outer peripheral side of the ball seat 120 at the portion indicated by reference symbol P in FIG. 7. In contrast, when the axial direction length L2 is set to be equal to or more than two times as long as the radial direction length L3, tightening of the fixing portion 412 to the ball seat 120 can be reliable, the attitude of the fixing portion 412 can be stable, and the above problem, which may occur in the pressing by the radial direction surface pressing portion 62A of the die member 62, can be prevented in a better manner.

On the other hand, when the axial direction length L2 is set to be more than four times as long as the radial direction length L3, the axial direction length of the flange portion 121 of the ball seat 120 may be unavailingly longer. The fixing of the ball seat 120 by the housing 130 may be performed via the rubber of the dust cover 401 at the flange portion 121, and the pressing, which contributes stud removal load, by the resin of the housing 130 to the opening neighborhood portion of the ball seat 120 may be performed incompletely. In contrast, when the axial direction length L2 is set to be equal to or less than four times as long as the radial direction length L3, the above problem does not occur.

As shown in FIG. 6, the projection portion 413B may be formed at the end portion 413 of the fixing portion 412 of the dust cover 401 so as to project in a direction opposite to the projection direction of the projection portion 413A. In this case, the axial direction length L2 may be an axial direction length of the end portion 413 of the fixing portion 412 having the projection portions 413A and 413B formed thereat.

2. Second Embodiment

In the second embodiment, in order to improve the sealing characteristics between the dust cover 401 and the die member 62 and the sealing characteristics between the dust cover 401 and the ball seat 120 in a better manner, the shape of the end portion 413 of the fixing portion 412 of the dust cover 401, the shape of the radial direction surface pressing portion 62A of the die 62, and the shape of the groove portion 121A of the flange portion 121 are improved instead of specifying the relationship of the length of each portion, the press margin, the interference, and the like. In the second embodiment, the same reference numerals are used for the same components as those in the first embodiment, and the explanation thereof will be omitted.

Specifically, the second embodiment is different from the projection portions 413A and 413B of the first embodiment in that a projection portion 414 is formed at the end portion 413 of the fixing portion 412 of the dust cover 401 and the projection portion 414 is pressed by the pressing surface of the radial direction surface pressing portion 62A of the die 62.

Figure 8:
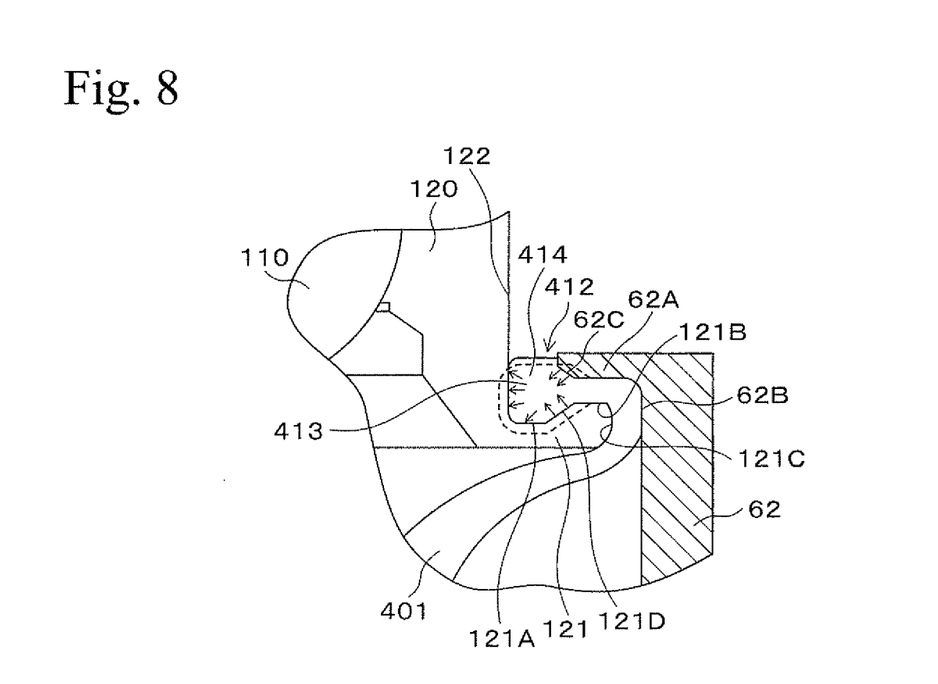
FIG. 8 is an enlarged side cross sectional diagram showing an insert molding condition of a production method for stabilizer links according to a second embodiment of the present invention and showing a portion including a fixing portion of a dust cover.
Figure 9:
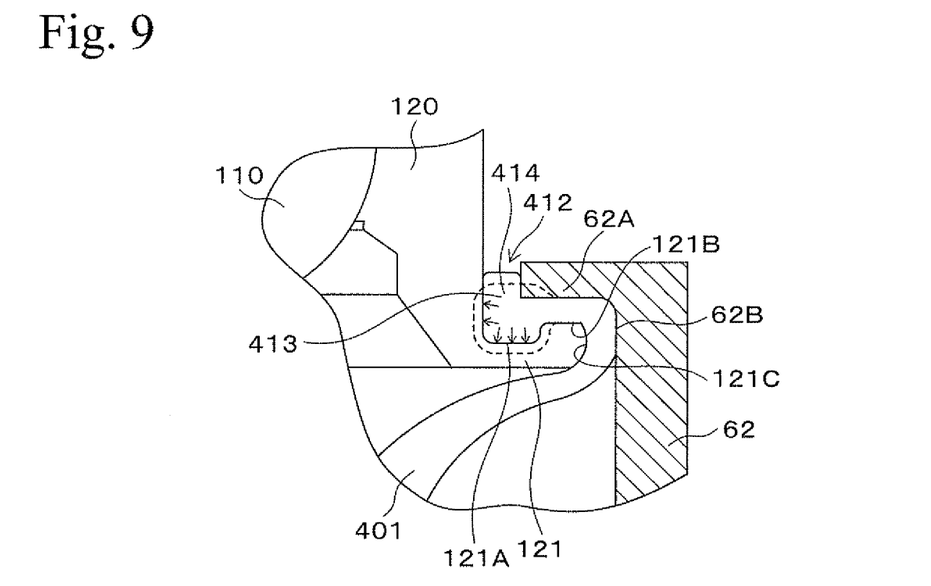
FIG. 9 is an enlarged side cross sectional diagram showing an insert molding condition of a modification example of a production method for stabilizer links according to a second embodiment of the present invention and showing a portion including a fixing portion of a dust cover.

The broken lines in FIGS. 8 and 9 show an initial shape (a condition before compressing) of the projection portion 414.

For example, in a feature shown in FIG. 8, a tapered surface 62C is formed at a leading end portion of a pressing surface of the radial direction surface pressing portion 62A of the die member 62. A tapered surface 121D is formed at the groove portion 121A of the flange portion 121 of the ball seat 120 so as to face the tapered surface 62C of the radial direction surface pressing portion 62A. In the initial shape of the projection portion 414, as shown by the broken line in FIG. 8, surfaces of the projection portion 414, which face the tapered surfaces 62C and 121D, have a tapered shape. In this manner, the initial shape of the projection portion 414 is a shape corresponding to a space formed by the side surface 122 of the outer peripheral side of the ball seat 120, the groove portion 121A of the flange portion 121, and the tapered surface 62C of the radial direction surface pressing portion 62A of the die member 62, and the initial shape of the projection portion 414 is set to be larger than the shape of the above space corresponding thereto.

In the above feature, the projection portion 414 is pressed toward the center portion of the projection portion 414 by component forces at the tapered surface 62C of the radial direction surface pressing portion 62A and the tapered surface 121D of the flange portion 121. Thus, the projection portion 414 is compressed by the side surface 122 of the outer peripheral side of the ball seat 120, the groove portion 121A of the flange portion 121, and the radial direction surface pressing portion 62A of the die member 62, internal pressure is thereby generated in the projection portion 414, and the projection portion 414 expands toward the outside between the radial direction surface pressing portion 62A of the die member 62 and the side surface 122 of the outer peripheral side of the ball seat 120. In this case, the shape of the projection portion 414 is designed such that the internal pressure generated in the projection portion 414 is larger than the injection molding pressure, so that the sealing between the dust cover 401 and the die member 62 and the sealing between the dust cover 401 and the ball seat 120 can be reliably performed. Thus, leakage of the resin to the outside can be effectively prevented in the insert injection.

For example, in a feature shown in FIG. 9, the projection portion 414 is formed so as to have a dumpling shape, and the projection portion 414 is held and squashed by the leading end portion of the radial direction surface pressing portion 62A of the die member 62 and the groove portion 121A of the flange portion 121. Thus, the projection portion 414 is compressed by the side surface 122 of the outer peripheral side of the ball seat 120, the groove portion 121A of the flange portion 121, and the radial direction surface pressing portion 62A of the die member 62, and the internal pressure in the projection portion 414 can be higher, so that the same effects as those in the feature shown in FIG. 8 can be obtained.

The invention claimed is:
1. A production method for stabilizer links, comprising:
a preparing step in which a stud ball, a ball seat, and a dust cover are prepared, wherein
the stud ball has a ball portion;
the ball seat has a flange portion and a groove portion, the flange portion extending from a side surface of an outer peripheral side of the ball seat to a radial direction outside, the groove portion formed at a boundary portion between the flange portion and the side surface of the outer peripheral side of the ball seat; and
the dust cover has a fixing portion and a projection portion formed at an end portion of the fixing portion;

a subassembly forming step in which a subassembly having the stud ball, the ball seat, and the dust cover is formed, wherein
   in the subassembly forming step, the ball portion of the stud ball is inserted into an opening portion of the ball seat, an inner peripheral side radial direction surface of the fixing portion of the dust cover is abutted to an outer peripheral side radial direction surface of the flange porting of the ball seat, and a portion of the projection portion of the fixing portion is engaged with the groove portion; and an injection molding step in which the subassembly is inserted into a die as a core, a cavity is formed, and injection molding is performed by injecting a resin into the cavity, so that a housing and a support bar are integrally formed, the housing covering an outer peripheral portion of the ball seat, the support bar supporting the housing, wherein
   in the inserting of the subassembly into the die, a die having a radial direction surface pressing portion extending toward a radial direction inside is used as the die, a predetermined gap is provided between an inner surface of the die and the outer peripheral portion of the ball seat, an outer peripheral side radial direction surface of the fixing portion of the dust cover is pressed toward the flange portion by the radial direction surface pressing portion of the die, and the fixing portion of the dust cover is held by the radial direction surface pressing portion of the die and the flange portion of the ball seat;

in the holding of the fixing portion, the projection portion of the fixing portion is compressed by the radial direction surface pressing portion of the die and the groove portion of the ball seat, and internal pressure is thereby generated in the projection portion;

a radial direction surface pressing portion side tapered surface is formed at an end portion of the radial direction surface pressing portion of the die;

a flange portion side tapered surface is formed at the groove portion of the flange portion of the ball seat and faces the radial direction surface pressing portion side tapered surface; and the projection portion is pressed by the radial direction surface pressing portion side tapered surface and the flange portion side tapered surface, thereby being compressed toward the radial direction inside.

\* \* \* \* \*